(12) United States Patent
Tsuda et al.

(10) Patent No.: US 7,718,972 B2
(45) Date of Patent: May 18, 2010

(54) RADIATION DETECTOR

(75) Inventors: Tomoaki Tsuda, Japan (JP); Jyunichi Ohi, Japan (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 12/324,529

(22) Filed: Nov. 26, 2008

(65) Prior Publication Data

US 2009/0134335 A1 May 28, 2009

(30) Foreign Application Priority Data

Nov. 28, 2007 (JP) ............................. 2007-307176

(51) Int. Cl.
*G01T 1/20* (2006.01)
(52) U.S. Cl. ...................... 250/367; 250/368
(58) Field of Classification Search .................. 250/367, 250/368
See application file for complete search history.

(56) References Cited

U.S. PATENT DOCUMENTS 5,012,103 A * 4/1991 Tanaka et al. ............... 250/368

2009/0032717 A1 * 2/2009 Aykac et al. ................ 250/367

FOREIGN PATENT DOCUMENTS

| JP | 2602287 B2 | 4/1997 |
| JP | 2000-346947 A | 12/2000 |
| JP | 2004-279057 A | 10/2004 |

\* cited by examiner

*Primary Examiner*—David P Porta
*Assistant Examiner*—Mark R Gaworecki
(74) *Attorney, Agent, or Firm*—Cheng Law Group, PLLC

(57) ABSTRACT

An emitted light in a scintillator element is sufficiently diffused in the scintillator array to be inputted into a photo multiplier tube (PMT) using a side face light guide that is optically coupled with respect to a side face of a scintillator array, except for in an end area. In the end area, the emitted light in the scintillator element is sufficiently diffused also in the side face light guide to be inputted into the PMT. In this way, also in the scintillator element in the end area, the emitted light is sufficiently diffused in the side face light guide, and thereby the precision of separation of a position calculation map in the end area may be improved, resulting in improved discriminating ability of a position in the end area.

20 Claims, 9 Drawing Sheets

Fig.1
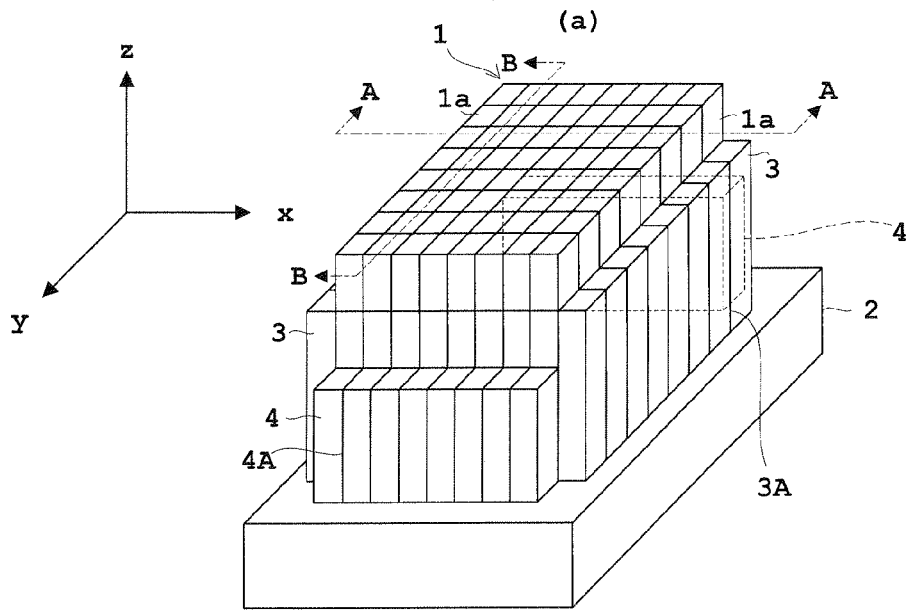
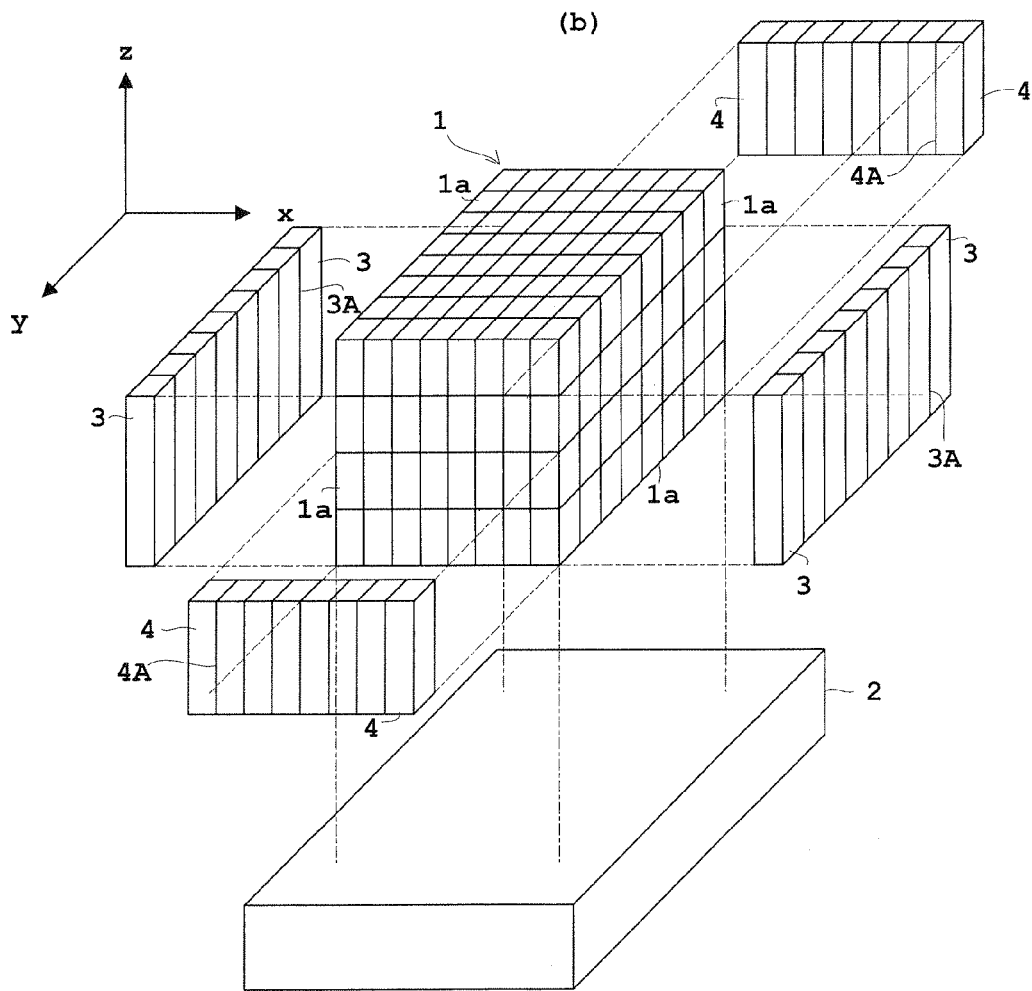

Fig. 9
(a)
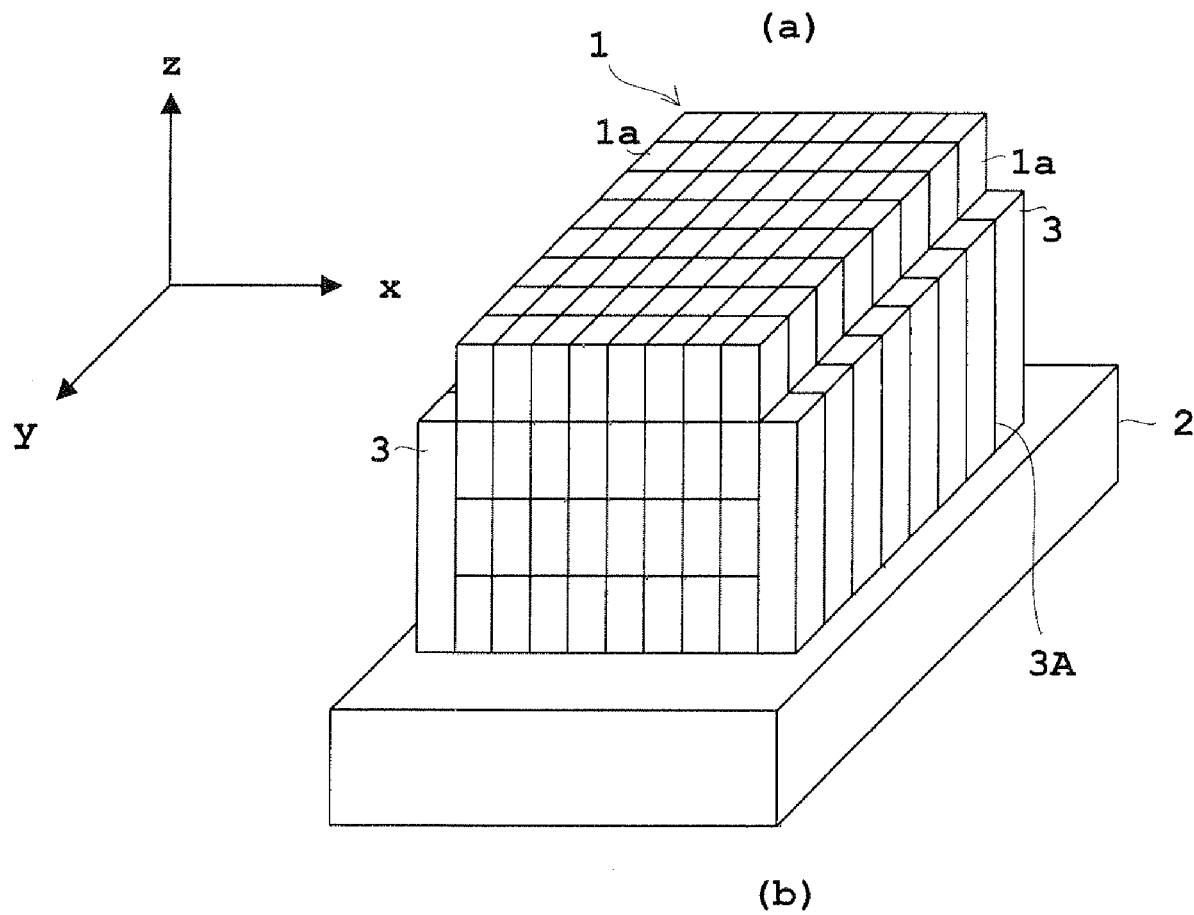
(b)
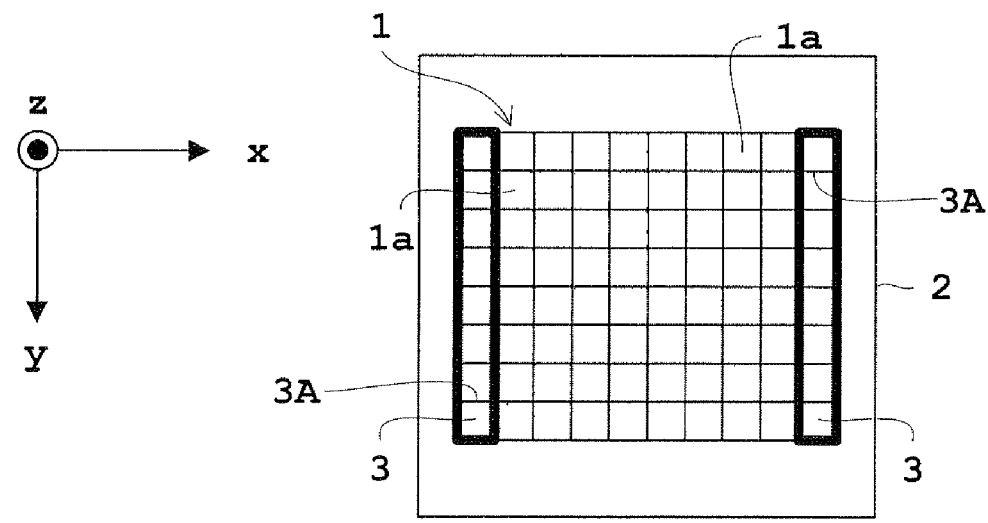

Fig.10
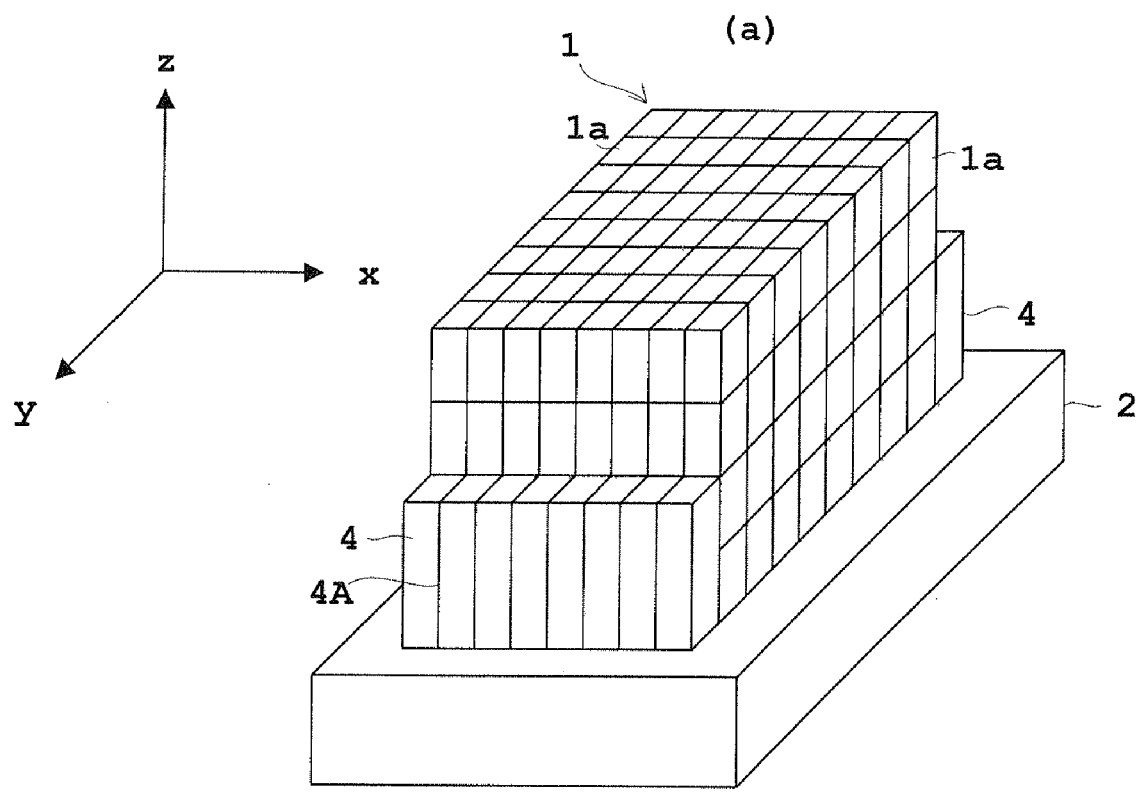
(a)
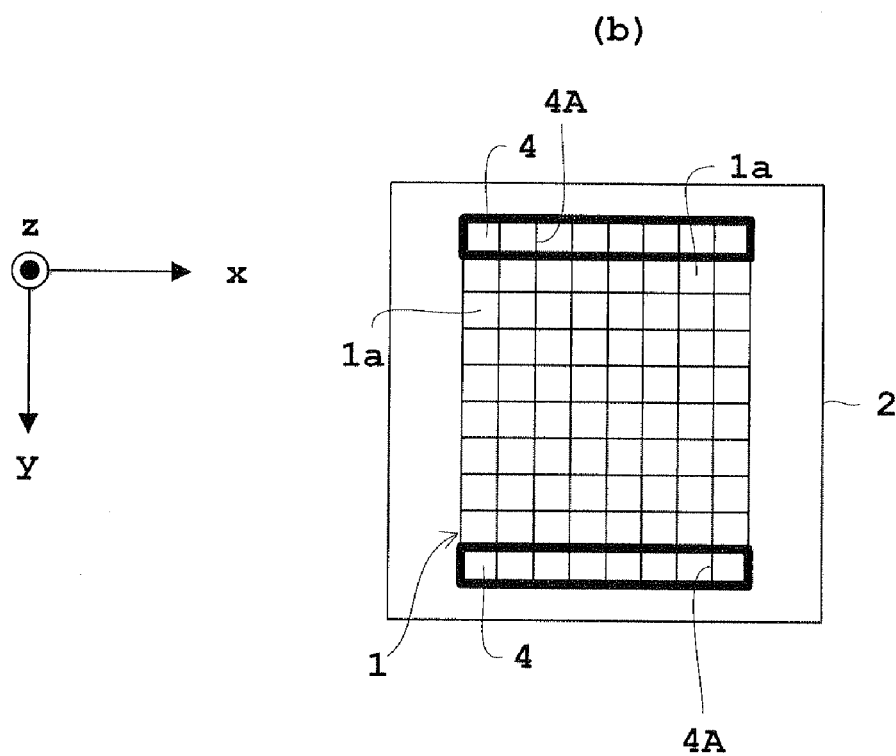
(b)

Fig.11
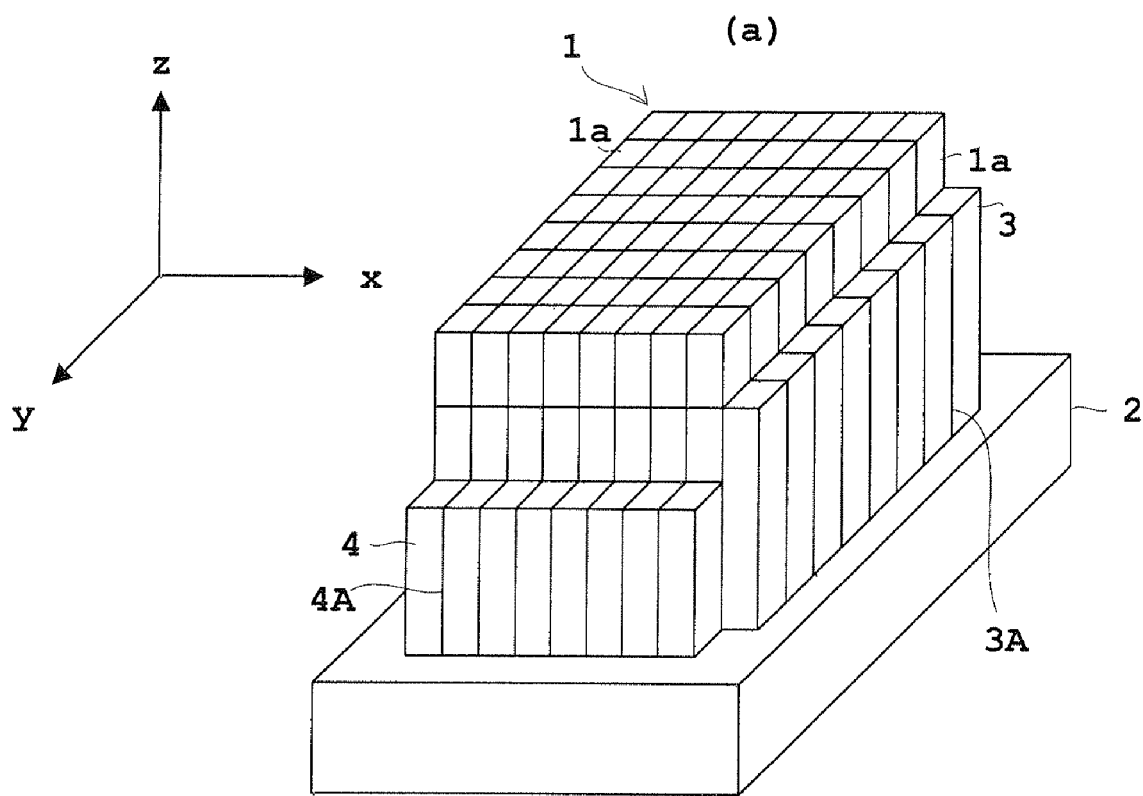
(a)
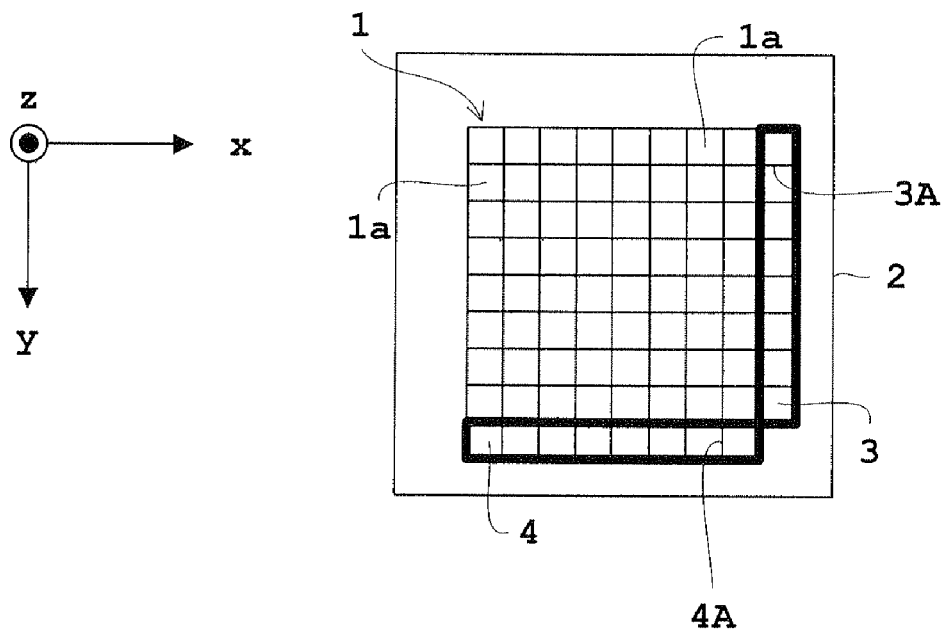
(b)

RADIATION DETECTOR

BACKGROUND OF THE INVENTION (1) Field of the Invention

The present invention relates to a radiation detector that is used for medical field, industrial field, nuclear field, etc., and the present invention particularly relates to a technique of a scintillator array having a plurality of three dimensionally disposed scintillator elements.

(2) Description of the Related Art

Radiation detectors have scintillators that convert radioactive rays into a light using an emitted light generated by incidence of radioactive rays; light guides that guide the light converted by the scintillator; and photo multiplier tubes that multiply the guided light to convert into electrical signals (for example, refer to Japan Patent No. 2602287 specification (page 4, FIG. 1). Radiation detectors used for nuclear medicine diagnosis apparatuses, such as PET (Positron Emission Tomography) apparatuses need high discriminating ability for discriminating positions of incidence of radioactive rays in the scintillator. Therefore, adopted are measures for improving the discriminating ability by increasing the number of scintillator elements that constitute the scintillator arrays. In recent years, DOI detectors enabling discrimination of the position of the light source (DOI: Depth of Interaction) that has given interaction, in particular, in a depth direction are developed by laminating scintillator elements also in a depth direction. (For example, refer to JP-A No. 2004-279057 (pages 1 to 13, FIG. 1).)

Here, disclosed is a radiation detector that disposes the first light guide on a side face of a scintillator, that disposes a photo detection means (that is, photoelectric conversion element) for detecting a light in the first light guide, that disposes the second light guide on a surface opposite to a plane of incidence of the scintillator into which radioactive rays enter, and that disposes a photo detection means to the second light guide (for example, refer to JP-A No. 2000-346947 official report (page 1 to 10, FIGS. 1 to 18)). This radiation detector has outstanding discriminating ability of a position in a large area, and enables background compensation.

However, the precision of separation of a position calculation map at an end area will drop in a two-dimensional position calculation map of the radiation detector of the above-described JP-A No. 2004-279057 official report, and as a result the position discriminating ability at the end area also reduces.

SUMMARY OF THE INVENTION

In view of such a problem, the present invention has been made, and an object of the invention is to provide a radiation detector that can improve the discriminating ability of a position at an end area.

In order to achieve such an object, the radiation detector in the present invention has the following constitution.

That is, the radiation detector in the present invention has a scintillator array consisting of a plurality of three dimensionally disposed scintillator elements, and a photoelectric conversion element, the photoelectric conversion element being optically coupled to the scintillator array, the radiation detector comprising a side face light guide that is optically coupled to at least a part of a side face of the scintillator array.

The radiation detector of the present invention has a side face light guide optically coupled to at least a part of the side face of the scintillator array, and thereby the emitted light in the scintillator element is sufficiently diffused in the scintillator array, in areas except for the end area, to enter a photoelectric conversion element. The emitted light in the scintillator element is sufficiently diffused, in the end area, also to the side face light guide to enter the photoelectric conversion element. In this way, the emitted light is sufficiently diffused into the side face light guide, also in the scintillator element in the end area, and therefore the precision of separation of the position calculation map can be raised at the end area, leading to improved discriminating ability of a position at the end area.

In the above-described invention, at least a part of the side face light guide element may be formed of optical members having light transmittance, and may also be formed with a scintillator. In the case of the former aspect, the emitted light in the scintillator element in the end area transmits from the scintillator element to the optical member to be sufficiently diffused to the side face light guide element. In the case of the latter aspect, the radioactive rays that has entered into the scintillator element in the end area is diffused to the scintillator that forms the side face light guide to be sufficiently diffused to the side face light guide. Furthermore, the light that has been emitted in the scintillator forming the side face light guide may also be inputted into the photoelectric conversion element.

In the former aspect, a reflector may or may not interpose on the side face of the side face light guide element adjacent with each other in the side face direction. Interposition of the reflector can avoid traffic of light, that is, cross-talk, between the side face light guide elements. In the former aspect, the optical member is made of epoxy resins, acrylic resins, or glass.

Furthermore, in the former aspect, the side face light guide element is preferably disposed on a side face opposite to the side face to which the reflector of the scintillator element in the end area adjoins, by partially interposing the reflector between a plurality of scintillator elements that constitute the scintillator array assembly. Even though the emitted light in a scintillator element in an end area tends to diffuse in a direction to a reflector, the light is reflected by the reflector, and diffused into a side face light guide element disposed in a side face in an opposite direction, thereby leading to more reliable diffusion to the side face light guide.

In the above-described aspects, in addition to the side face light guide, an optically coupled bottom light guide may be disposed between the scintillator array and the photoelectric conversion elements. The emitted light in the scintillator element is sufficiently diffused in the scintillator array in areas except for the end area, and is inputted into the photoelectric conversion element through the bottom light guide. In the end area the emitted light in the scintillator element is sufficiently diffused also in the side face light guide, and is inputted into the photoelectric conversion element.

In the case of such disposition of the bottom light guide, the side face light guide and the bottom light guide are preferably formed in a state of close contact with each other, and are optically integrally formed with each other without any boundary between the light guides. In this way, the light diffused in the side face light guide can be guided reliably to the bottom light guide.

In these above-described aspects, the photoelectric conversion element is a photo detector having a plurality of photo detecting sensors disposed in a shape of a two-dimensional plane. Use of this photo detector allows creation of a two-dimensional position calculation map. The photo detector includes a multi-anode photo multiplier tube, a multi channel avalanche photodiode, or a silicon photomultiplier etc.

Since the radiation detector concerning the present invention has a side face light guide optically coupled with respect to at least a part of the side face of a scintillator array, the emitted light is sufficiently diffused into the side face light guide also in the scintillator element in the end area, and the precision of separation of the position calculation map can be raised at the end area, leading to improved discriminating ability of a position in the end area.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 1(a) is a schematic perspective view of a radiation detector concerning Example 1, and (b) is an exploded perspective view of the radiation detector concerning Example 1;

FIG. 9(a) is a schematic perspective view of a radiation detector concerning modification, and (b) is a plan view of (a);

FIG. 10(a) is a schematic perspective view of a radiation detector concerning a further modification, and (b) is a plan view of (a);

FIG. 11(a) is a schematic perspective view of a radiation detector concerning a further modification, and (b) is a plan view of (a);

DESCRIPTION OF THE PREFERRED EMBODIMENTS

Hereinafter, suitable Examples of the present invention will be described in detail with reference to drawings.

Embodiment 1

FIG. 1(a) is a schematic perspective view of a radiation detector concerning Example 1, and FIG. 1(b) is an exploded perspective view of the radiation detector concerning Example 1.

In this Example 1 the radiation detector is used for PET apparatuses etc. as described above, to detect radioactive rays (for example, gamma rays) emitted from a radioactive isotope (RI) that has been administered to a subject and has accumulated in a region of interest. The PET apparatus obtains a tomogram image of the RI distribution of the region of interest based on the detected radioactive rays.

Figure 2:
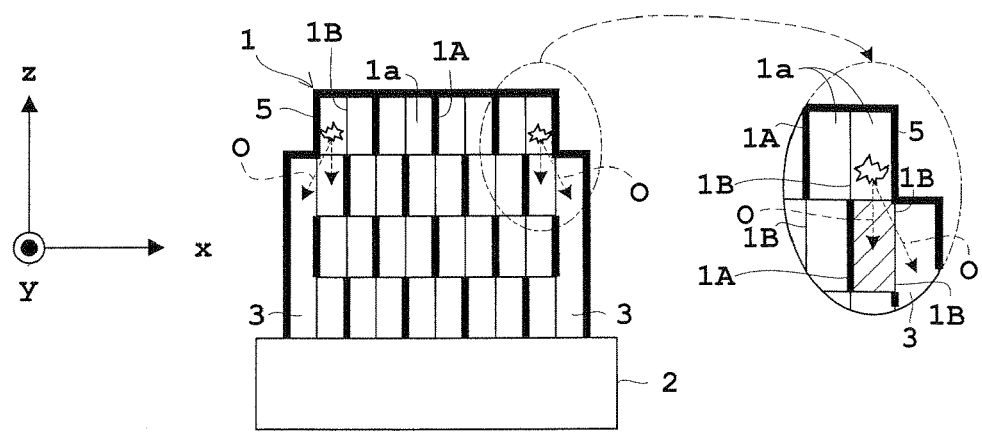
FIG. 2 are an A-A arrowed cross-section view of FIG. 1(a), and an enlarged view thereof.
Figure 3:
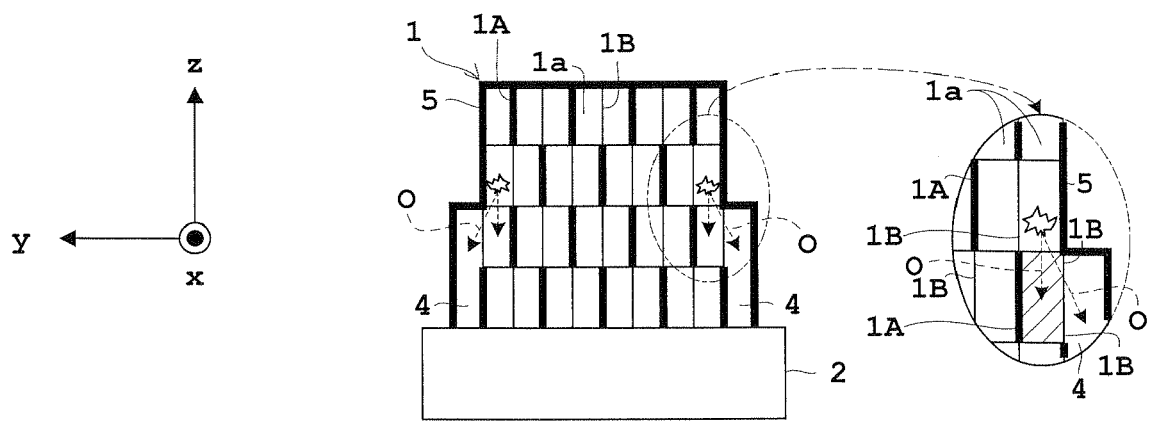
FIG. 3 are a B-B arrowed cross-section view of FIG. 1(a), and an enlarged view thereof.

As shown in FIG. 1, the radiation detector comprises a scintillator array 1; and a flat panel type multi-anode photo multiplier tube (PMT: Photo Multiplier Tube) 2, the photo multiplier tube being optically coupled to the scintillator array 1. The scintillator array 1 is formed of a plurality of three dimensionally disposed scintillator elements 1a. FIG. 1 to FIG. 3 illustrate a scintillator element 1a that is disposed in a matrix with 8-row×8-column in the x and the y directions, and in 4-stage in the z direction (that is, in the depth direction). The number of the scintillator elements 1a is not in particular limited. The scintillator element 1a emits a light with incidence of radioactive rays, and converts the radioactive rays into a light. In this Example 1, the flat panel type multi-anode photo multiplier tube (hereinafter, abbreviated as "PMT") 2 is formed of 2-inch by 2-inch sized anodes arrayed in a two-dimensional plane with 256 ch (16×16 ch in the x and y directions). The PMT2 multiplies the light converted by the scintillator array 1, and converts the light into an electrical signal. The scintillator array 1 is equivalent to the scintillator array in the present invention, the scintillator element 1a is equivalent to the scintillator element in the present invention, and the PMT2 is equivalent to the photoelectric conversion element in the present invention. Furthermore, the PMT2 is equivalent also to the photo detector in the present invention.

As the scintillator element 1a, inorganic crystals, such as $Bi_4Ge_3O_{12}$ (BGO); $Gd_2SiO_5$ (GSO); $Lu_2SiO_5$:Ce, ($Lu_2SiO_5$ doped by Ce, that is, LSO); $Lu_{2x}Y_{2(1-x)}SiO_5$:Ce, ($Lu_{2x}Y_{2(1-x)}SiO_5$ doped by Ce, that is, LYSO); $Lu_{2x}Gd_{2(1-x)}SiO_5$:Ce, ($Lu_{2x}Gd_{2(1-x)}SiO_5$ doped by Ce, that is, LYSO); NaI (sodium iodide); $BaF_2$ (barium fluoride); CsF (cesium fluoride), and $LaBr_3$ (lanthanum bromide) etc. may be used.

The radiation detector further has a side face light guides 3 and 4 that are optically coupled to the side face of the scintillator array 1. On side faces in an x direction (side faces intersecting perpendicularly to the x direction), the radiation detector has side face light guides 3 on right and left sides, respectively. Similarly, on side faces in a y direction (side faces intersecting perpendicularly to the y direction) the radiation detector comprises side face light guides 4 on back and front sides, respectively. The side face light guides 3 and 4 are equivalent to the side face light guide in the present invention.

In this embodiment 1, both side face light guides 3 and 4 are formed of an optical member having light transmittance, respectively. As the optical member, for example, resins, such as epoxy resins or acrylic resins, and glass may be mentioned. Each side face light guide element 3 is disposed to have a reflector 3A interposing between side faces of the mutually adjoining side face light guide elements in a side face direction. Similarly, each side face light guide is disposed to have a reflector 4A interposing between side faces of the mutually adjoining side face light guides elements in a side face direction. The pitch (interval) between the side face light guide elements of the side face light guides 3 and 4 is set the same as the pitch between the scintillator elements 1a. This embodiment 1 uses a white plastic film as reflectors 3A and 4A. That is, this embodiment 1 uses a shaping-processed molded body obtained by embedding of a transparent epoxy resin or an acrylic resin with a white plastic film, as the side face light guides 3 and 4 and the reflectors 3A and 4A. In addition, as the reflectors 3A and 4A, polyester films including a multilayer structure of silicon oxides and titanium oxides; ground aluminum; films having titanium oxides or barium sulfate applied to the surface of a thin substrate; films having a white tape applied on the surface of a thin substrate; films having vapor-deposited aluminum on the surface of a thin smooth substrate etc. may be mentioned.

Hereinafter, more detailed construction of the side face light guide assemblies 3 and 4 will be described with reference to FIG. 2 and FIG. 3. FIG. 2 illustrates an A-A arrowed cross-section view of FIG. 1 (a), and an enlarged view thereof. FIG. 3 illustrates a B-B arrowed cross-section view of FIG. 1 (a), and an enlarged view thereof. In FIG. 2 and FIG. 3, in order to distinguish a reflector and a transmissive material, the reflector is illustrated with a thick frame. The scintillator array 1 has alternately interposing reflectors 1A and transmissive materials 1B between mutually adjoining scintillator elements 1a within each stage. Furthermore, the reflectors 1A and the transmissive materials 1B of each stage are disposed alternately. Here, the component that interposes in each stage is the transmissive material 1B. The reflector 1A may be formed with the material used in the above-described reflectors 3A and 4A. As the transmissive material 1B, optical binding materials or transparent films etc. that are adapted to the physical property of the emission wavelength of the scintillator and that has satisfactory transparency may be mentioned.

As illustrated in FIG. 2, the side face light guide 3 is integrally formed without interposition of transmissive materials in a depth direction (the direction of z). The height (depth) of the side face light guide 3 is a height for three stages of the scintillator elements 1a, and it is formed lower than the height of whole stages (in FIG. 1, and FIG. 2, 4 stages) of the scintillator element 1a. That is, since the emitted light (refer to the "O" in FIG. 2) is diffused downward in emission of a light accompanying the radioactive rays that have entered, the side face light guide 3 is not disposed in the uppermost stage of the scintillator element 1a, and the side face light guide 3 is disposed in the lower stage.

As illustrated in FIG. 2, since the reflector 1A and the transmissive material 1B interpose, the height of the side face light guide 3 is set as 3 stages. That is, the side face light guide 3 is preferably disposed on a side face opposite to the side face to which the reflector 1A of the scintillator element 1a in the end area adjoins (the scintillator element 1a is referred to be hatched with forward diagonal lines at the upper right in the enlarged view in FIG. 2). In FIG. 2, the corresponding reflectors 1A are in the second stage from top and in the lowermost stage. The height of the side face light guide 3 may be set as one stage by disposing the side face light guide 3 in the lowermost stage, but diffusion of the light will be difficult. For sufficient diffusion of the light, the height of the side face light guide 3 is more preferably set larger. In FIG. 2, the height of the side face light guide 3 is set as three stages by disposing the side face light guide 3 in the second stage from the top.

Similarly, as illustrated in FIG. 3, the side face light guide 4 is also integrally formed without interposition of the transmissive material in a depth direction (the direction of z). The height (depth) of the side face light guide 4 is 2 stages of the scintillator element 1a, and is formed lower than the height of whole stages (in FIG. 1, and FIG. 3, 4 stages) of the scintillator element 1a. The reason is the same as that in FIG. 2.

As illustrated in FIG. 3, since the reflector 1A and the transmissive material 1B interpose, the height of the side face light guide 4 is set as 2 stages. That is, the side face light guide 4 is preferably disposed on a side face opposite to the side face to which the reflector 1A of the scintillator element 1a in the end area adjoins (the scintillator element 1a is referred to be hatched with forward diagonal lines in the enlarged view in FIG. 3). In FIG. 3, except for the uppermost stage, the corresponding reflectors 1A is the second stage from the bottom. Here, the height of the side face light guide 4 is set as 2 stages by disposing the side face light guide 4 in the second stage from the bottom in FIG. 3.

As shown in FIG. 2 and FIG. 3, in order to avoid transmission of the emitted light to the exterior of the scintillator array 1, and the side face light guides 3, and 4, the peripheral part of the scintillator array 1, the side face light guides 3, and 4 are covered by the reflector 5. The reflector 5 may be formed with materials used in the above-described reflectors 1A, 3A, and 4A.

Figure 4:
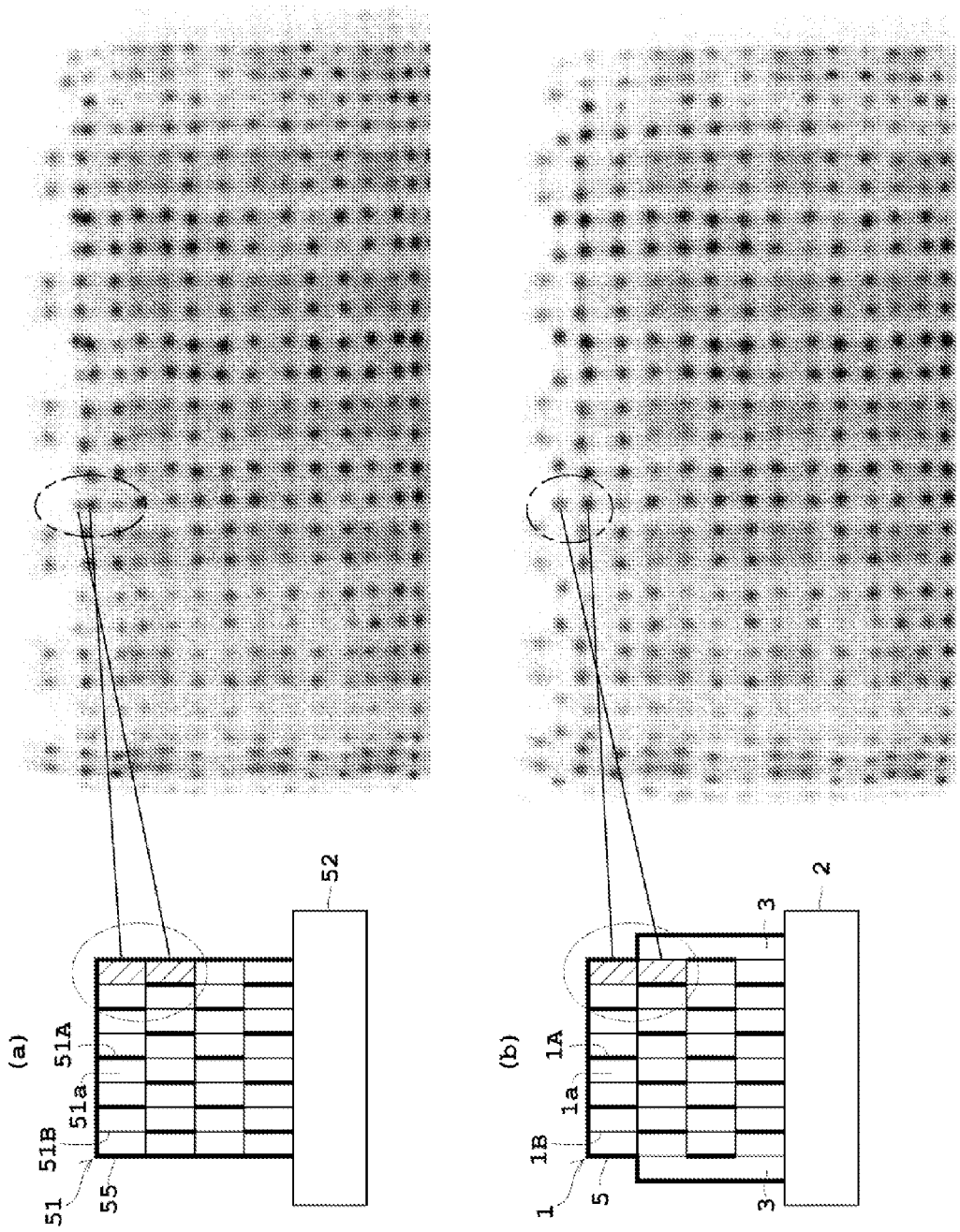
FIG. 4(a) are a sectional view of a conventional radiation detector, and a two-dimensional position calculation map thereof, and (b) are a sectional view of a radiation detector concerning Example 1, and a two-dimensional position calculation map thereof.

Next, the position calculation map when a conventional radiation detector and the radiation detector concerning this embodiment 1 are used will be described, with reference to FIG. 4. FIG. 4 illustrates two-dimensional position calculation maps in use of the conventional radiation detector and the radiation detector concerning embodiment 1. In FIG. 4, two-dimensional position calculation maps in case of uniform irradiation of gamma rays were obtained, respectively to check the precision of separation of the position calculation map at the end area, using the conventional radiation detector and the radiation detector concerning this embodiment 1. The view on the left-hand side of FIG. 4(a) is a sectional view of the conventional radiation detector, and the view on the right-hand side is the two-dimensional position calculation map at that time. The view on the left-hand side of FIG. 4(b) is a sectional view of the radiation detector concerning this embodiment 1, and the view on the right-hand side is the two-dimensional position calculation map at that time. The upper part and the lower part of the position calculation map correspond to the end area and the central part of the scintillator array, respectively, and one scintillator element corresponds to one dot, respectively.

Here, the notation 51 of the conventional radiation detector designates a scintillator array, the notation 51a an scintillator element, the notations 51A and 55 reflectors, the notation 51B designates a transmissive material, and the notation 52 designates a PMT. Since the conventional radiation detector is not provided with the side face light guide, the emitted light does not sufficiently diffuse in the scintillator element 51a in the end area. The two-dimensional position calculation map of the two scintillator elements 51a in FIG. 4 enclosed with alternate long and short dash line (refer to the scintillator element 51a hatched with backward diagonal lines in FIG. 4(a)) are drawn as one overlapped dot enclosed with alternate long and short dash line in the right view. That is, the two-dimensional position calculation map only provides the position calculation map with a reduced precision of separation at the end area.

On the other hand, since the radiation detector concerning this embodiment 1 is provided with the side face light guides 3 and 4, the emitted light in the scintillator element 1a in the end area is sufficiently diffused in the side face light guides 3 and 4. The two-dimensional position calculation map of the two scintillator elements 1a in FIG. 4 enclosed with alternate long and short dash line (refer to the scintillator element 1a hatched with backward diagonal lines in FIG. 4(b)) are drawn as two separated dots enclosed with alternate long and short dash line in the right view. That is, it is confirmed that the dots that could not be discriminate by overlapping of dots in the two scintillator elements in the conventional radiation detector are separated to be discriminated using the side face light guides 3 and 4, leading to the improved precision of separation of the position calculation map at an end areas in the two-dimensional position calculation map.

In the radiation detector concerning this embodiment 1 provided with the above-described construction, the emitted light in the scintillator element 1a allows sufficient diffusion in the scintillator array 1 except for the end area by disposition of the side face light guides 3 and 4 optically coupled with respect to the side face of the scintillator array 1, and thus the light will be inputted into PMT2. In end areas, the emitted light in the scintillator element 1a is sufficiently diffused also into the side face light guides 3 and 4, and will be inputted into PMT2. In this way, the emitted light in the scintillator element 1a in the end area is also sufficiently diffused in the side face light guides 3 and 4, and the precision of separation of the position calculation map at the end area can be improved, leading to improved discriminating ability of a position in the end area. As in this embodiment 1, use of radiation detectors disposed in a ring shape in PET apparatuses can provide images (tomogram image of RI distribution) without reduction of partial spatial resolution in the end areas of each detector, resulting in improved diagnostic imaging ability.

Since the side face light guide assemblies 3 and 4 are formed with an optical member having light transmittance in this embodiment 1, the emitted light in the scintillator element 1a in the end area transmits from the scintillator element 1a to the optical member, and is sufficiently diffused in the side face light guides 3 and 4. In this embodiment 1, since the reflector 3A is interposed in the side face of the mutually adjoining side face light guides of the side face light guide in the side face direction and the reflector 4A is further interposed in the side face of the mutually adjoining side face light guides of the side face light guide 4 in the side face direction, traffic, that is, cross-talk, of light between the side face light guides 3 and 4 can be avoided.

In this embodiment 1, the side face light guides 3 and 4 are preferably disposed in a side face opposite to the side face to which the reflector 1A of the scintillator element 1a in the end area adjoins. Even though the emitted light (refer to the "O" in FIG. 2 and FIG. 3) in the scintillator element 1a in the end area tends to diffuse in the direction of the reflector 1A, the light is reflected by the reflector 1A to be diffused in the side face light guides 3 and 4 that are disposed in a side in the opposite direction, leading to more reliable diffusion to the side face light guides 3 and 4.

This embodiment 1 uses a photo detector (in this embodiment 1 photo multiplier tube (PMT) 2) having a plurality of (256 ch in this embodiment 1) photo detecting sensors (anode, in this embodiment 1) disposed in a shape of a two-dimensional plane, as a photoelectric conversion element in the present invention. A two-dimensional position calculation map can be created with this photo detector.

The above-described JP-A No. 2000-346947 official report also disposes the first light guide in a side face of a scintillator, and optically couples and disposes a photo detection means (in this embodiment 1, equivalent to PMT2) to the first light guide together. However, it has only a path passing along the first light guide, as a path of the light to the photo detection means disposed in the first light guide from the scintillator, and does not have a path through which the light passes from the scintillator directly to the photo detection means.

On the other hand, in the present invention including in this embodiment 1, as described above, the emitted light in the scintillator element 1a is sufficiently diffused in the scintillator array 1 in areas except for the end area, and the emitted light in the scintillator element 1a is sufficiently diffused also in the side face light guides 3 and 4 to be inputted into PMT2, respectively in the end areas. Therefore, as the path for the light from the scintillator array 1 to the PMT2, a path, through which the light passes from the scintillator array 1 directly to the PMT2, exists in addition to the end area except for the path that passes along the side face light guides 3 and 4 provided for diffusion in the end area. In the case of the present invention including the embodiment 1, the side face light guides 3 and 4 are provided in order to sufficiently diffuse the light in the end area. It is to be understood that this is different from the object and the structure for which the first light guide of the above-described JP-A No. 2000-346947 official report was provided.

Embodiment 2

Next, the embodiment 2 of the present invention will be described with reference to drawings.

Figure 5:
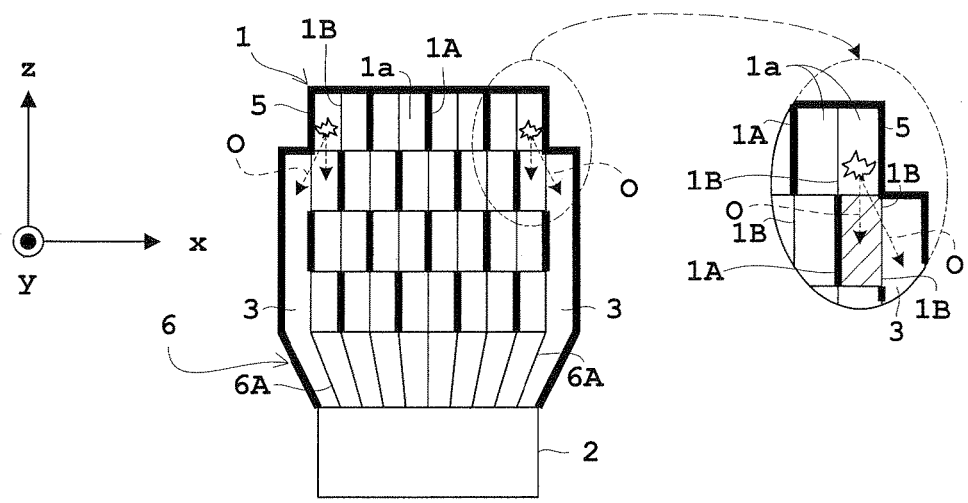
FIG. 5 are a schematic sectional view of a radiation detector concerning Example 2, and an enlarged view thereof.
Figure 6:
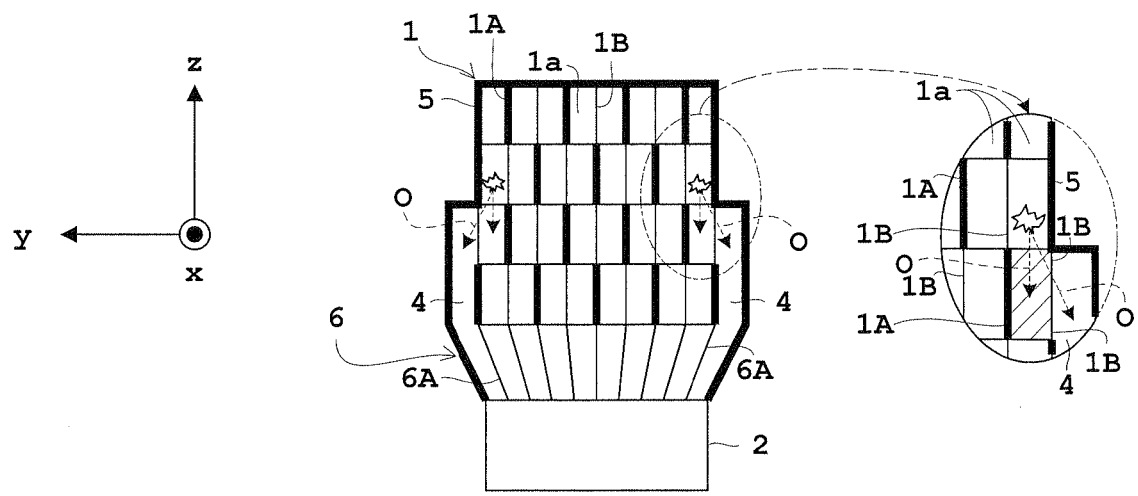
FIG. 6 are a schematic sectional view of a radiation detector concerning Example 2, and an enlarged view thereof.

FIG. 5 and FIG. 6 are the schematic sectional view of the radiation detector concerning Embodiment 2, and the enlarged view thereof. In the same spots as that in the above-described embodiment 1, the same notation will be provided and the description will be omitted.

In this embodiment 2, as shown in FIG. 5 and FIG. 6, the point of difference with the above-described embodiment 1 is that an optically coupled bottom face light guide 6 between the scintillator array 1 and the PMT2 is provided. In addition, the same structure and material as those used for the above-described embodiment 1 are used except for the portion concerning the bottom face light guide 6, in the scintillator array 1, the PMT2, the side face light guides 3 and 4, the reflector, the transmissive material, etc. excluding the bottom face light guide 6. Here, in FIG. 5, a sectional view in the same direction of the bottom face light guide 6 is added to the sectional view in the direction of FIG. 2 of the above-described embodiment 1. In FIG. 6, a sectional view in the same direction of the bottom face light guide 6 is added to the sectional view in the direction of FIG. 3 of the above-described embodiment 1. The bottom face light guide 6 is equivalent to the bottom face light guide in the present invention.

In the structure of FIG. 1 to FIG. 3 of the above-described embodiment 1, when the scintillator array 1 is expanded up to the effective light-receiving area of the PMT2, the sensitivity in the vicinity of the end area of the PMT2 may decrease, leading to possible resultant reduction of the resolution of the map. For this reason, the bottom face light guide 6 narrowly formed with approach downward is provided as shown in FIG. 5 and FIG. 6, and thereby the bottom face light guide 6 optically coupled with the scintillator array 1 is designed to be smaller than the effective light-receiving area of the PMT2 in this embodiment 2. Disposition of such bottom face light guide 6 avoids sensitivity degradation in the vicinity of the end area of the PMT2, and also avoids reduction of the map resolution due to the sensitivity degradation.

In this embodiment 2 the bottom face light guide 6 is formed of the optical member having light transmittance, respectively, like the side face light guides 3 and 4, and, for example, resins, such as epoxy resins and acrylic resins may be mentioned, as the optical member having light transmittance. Like the side face light guides 3 and 4, each bottom face light guide 6 is respectively disposed with interposing reflector 6A on the side face of the bottom face light guide 6 adjoining with each other together with the interposing reflector 6A in the side face direction. The pitch at the side of the scintillator array 1 between each bottom face light guide 6 is designed to be the same as the pitch between each scintillator elements 1a. As the reflector 6A, a white plastic film is adopted as in the reflectors 3A and 4A. As the bottom face light guide 6 and the reflector 6A, a material obtained by embedding a transparent epoxy resin or acrylic resin or a glass with a white plastic film to be shape-processed is used. In addition, as in the case of the reflectors 3A and 4A, polyester films including a multilayer structure of silicon oxides and titanium oxides; ground aluminum; films having titanium oxides and barium sulfate applied to the surface of a thin substrate; films having a white tape applied on the surface of a thin substrate; films having vapor-deposited aluminum on the surface of a thin smooth substrate etc. may be mentioned as the reflector 6A.

The reflector 5 existed to the peripheral part of the scintillator array 1 or the side face light guides 3 and 4 in the above-described embodiment 1. In this embodiment 2, however, the peripheral part of the bottom face light guide 6 is also covered by the reflector 5 in order to avoid transmission of the emitted light to the exterior of the bottom face light guide 6. Furthermore, in this embodiment 2, the side face light guides 3 and 4 and the bottom face light guide 6 in the end area are preferably formed in a closely contacted condition with each other, and preferably do not have any boundary between each light guide 3 and 6 and between each light guide 4 and 6, and they are optically and integrally formed, as shown in FIG. 5 and FIG. 6.

The radiation detector concerning this embodiment 2 provided with the above-described construction is provided with the optically coupled side face light guides 3 and 4 with respect to side face of the scintillator array 1. Thereby, the emitted light in the scintillator element 1a is sufficiently diffused in the scintillator array 1 to be inputted into the PMT2 through the bottom face light guide 6 in areas except for the end area. In addition, the emitted light in the scintillator element 1a is sufficiently diffused also in the side face light guides 3 and 4 to be inputted into the PMT2 in the end area. The emitted light is sufficiently diffused in the side face light guides 3 and 4 also in the scintillator element 1a in the end area, and thus the precision of separation of the position calculation map and the discriminating ability of a position in the end area may be improved.

In this embodiment 2, when such a bottom face light guide 6 is provided, the side face light guides 3 and 4 and the bottom face light guide 6 in the end area are preferably formed in a closely contacted condition with each other. Furthermore, there is preferably no boundary between each light guide 3 and 6 and between each light guide 4 and 6, and they are optically and integrally formed as described above. In this way, the light diffused in the side face light guides 3 and 4 can be guided reliably to the bottom face light guide 6.

In the case of the present invention including this embodiment 2, as described above, the emitted light in the scintillator element 1a is sufficiently diffused in the scintillator array 1 in areas except for the end area, and the emitted light in the scintillator element 1a is sufficiently diffused also in the side face light guides 3 and 4 in the end area, and then both of the diffused light are inputted into the PMT2, respectively. Therefore, as the path for the light from the scintillator array 1 to the PMT2, the path through which the light passes directly from the scintillator array 1 to the PMT2 exists besides in the end area in addition to the path that passes along the side face light guides 3 and 4 provided for diffusion in the end area. As a result, the object and structure having the first light guide in the above-described JP-A No. 2000-46947 official report are different from those of the present invention.

The present invention is not limited to the above-described embodiments, and the following modified implementation will be possible.

(1) In the above-described each embodiment, the radiation detector for detecting gamma rays described as an example, but the present invention may be applied to detectors for detecting radioactive rays other than gamma rays, for example, X rays.

(2) In the above-described each embodiment, a flat panel type multi-anode photo multiplier tube (PMT) 2 was described as a photo detector for an example, but the photo detector is not in particular limited as long as it is a usually used photo detector as is exemplified by multi channel avalanche photodiodes or silicon photo-multiplier etc.

(3) In the above-described each embodiment, the side face light guides 3 and 4 are made of an optical member (for example, epoxy resins, acrylic resins, or glass) that has light transmittance, but they may be formed by a scintillator. When they are formed by a scintillator, radioactive rays that entered into the scintillator element 1a in the end area are diffused in the scintillator that forms the side face light guides 3 and 4 to emit a light in the in the scintillator, resulting in sufficient diffusion in the side face light guides 3 and 4. The materials described in the scintillator element 1a may be used as a material for forming the scintillator. Furthermore, a combination of an example, as in each embodiment, wherein the side face light guide is formed by an optical member having light transmittance, and an example wherein the side face light guide is formed by a scintillator may be adopted. That is, a part of the side face light guide is formed by the optical member having light transmittance, and at the same time the remaining part may be formed by the scintillator.

(4) In the above-described each embodiment, the reflector 3A and 4A were interposed, respectively, on a side face of the mutually adjoining side face light guides 3 and 4 with each other in the side face direction, but the interposition of the reflector is not always necessary in the case where the cross-talk is not taken into consideration, or the cross-talk does not occur. For example, a cut material from a transparent acrylic resin plate having a thickness of about several millimeters without the reflector may be formed as a side face light guide. Similar materials may be used also for the bottom face light guide 6 of embodiment 2, that is, interposition of the reflector is not always necessary.

Figure 7:
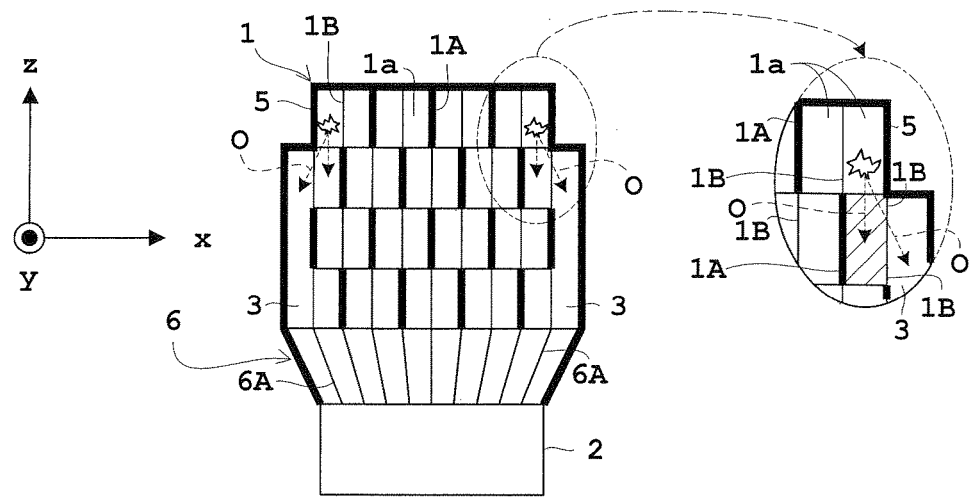
FIG. 7 are a schematic sectional view of a radiation detector concerning modification of Example 2, and an enlarged view thereof.
Figure 8:
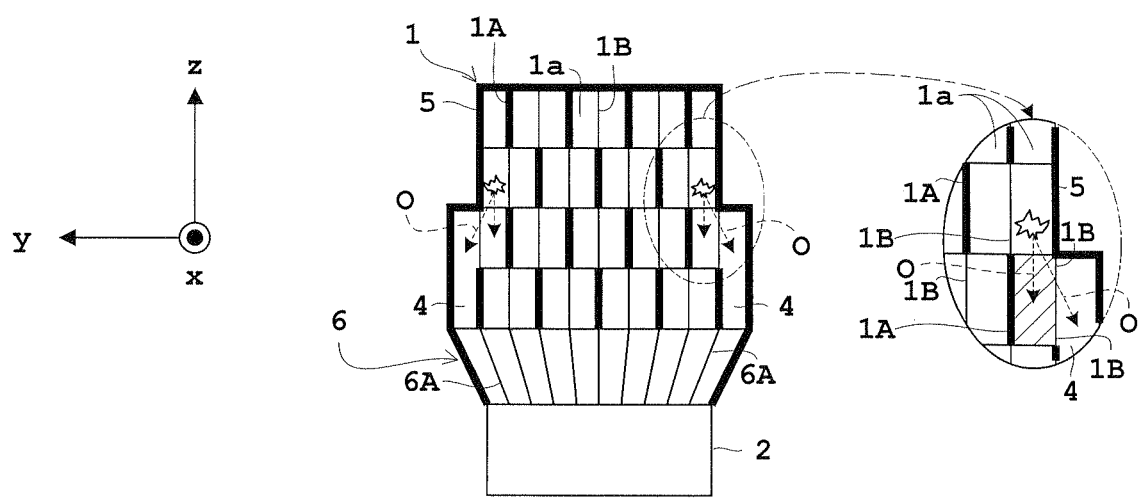
FIG. 8 are a schematic sectional view of a radiation detector concerning modification of Example 2, and an enlarged view thereof.

(5) In the above-described embodiment 2, the side face light guides 3 and 4 and the bottom face light guide 6 are formed in a closely contacted condition with each other, and do not have any boundary between each light guides 3 and 6 and between each light guides 4 and 6, and they are optically and integrally formed, but a boundary may be provided by interposition of a transmissive material between the side face light guides 3 and 4 and the bottom face light guide 6 as shown in FIG. 7 and FIG. 8. In addition, FIG. 7 is a modified embodiment of the sectional view in the direction of FIG. 5 of the above-described embodiment 2, and FIG. 8 is modified embodiment of the sectional view in the direction of FIG. 6 of the above-described embodiment 2.

(6) The above-described each embodiment is provided with a structure having the side face light guides 3 and 4 optically coupled to all the side faces of the scintillator array 1, that is, a structure wherein all the side faces of the scintillator array 1 has the optically coupled side face light guides 3 and 4. The present invention is not limited to each embodiment, as long as it is a structure provided with a side face light guide that is optically coupled to at least a part of the side face of the scintillator array 1. For example, following structures may be adopted: a structure that has the side face light guides 3 on the right and left sides, respectively, on a side face in the x direction (a side face perpendicularly intersecting to the x direction) as illustrated in FIG. 9, a structure that has the side face light guides 4 on a front and back side, respectively, on a side face in the y direction (a side face perpendicularly intersecting to the y direction) as illustrated in FIG. 10, and a structure that has only one side face light guide 3 on a side face in the x direction (a side face perpendicularly intersecting to the x direction), and simultaneously that has only one side face light guide 4 on a side face in the y direction (a side face perpendicularly intersecting to the y direction) as illustrated in FIG. 11. In addition, a structure that has only one side face light guide 3 on a side face in the x direction (a side face perpendicularly intersecting to the x direction), and a structure that has only one side face light guide 4 on a side face in the y direction (a side face perpendicularly intersecting to the y direction) may be adopted. Here, FIG. 9 (a) to FIG. 11 (a) are schematic perspective views concerning modified examples, FIG. 9 (b) is a plan view of FIG. 9 (a), FIG. 10 (b) is a plan view of FIG. 10 (a), and FIG. 11 (b) is a plan view of FIG. 11 (a). In addition, the area of the side face light guide is illustrated by a thick frame in order to distinguish the area of the side face light guide from the scintillator array 1 in FIG. 9 (b) to FIG. 11 (b).

Figure 12:
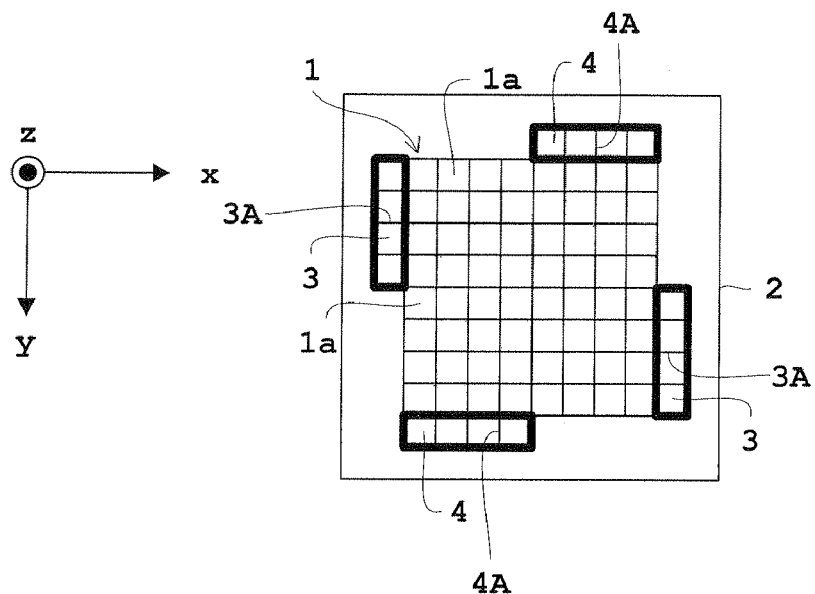
FIG. 12 is a schematic plan view of a radiation detector concerning a further modification.

(7) The above-described each embodiment is provided with a structure having the side face light guides 3 and 4 optically coupled to all the side faces of the scintillator array 1, that is, a structure wherein all the side faces of the scintillator array 1 has the optically coupled side face light guides 3 and 4. The present invention is not limited to each embodiment, as long as it is a structure provided with a side face light guide that is optically coupled to at least a part of the side face of the scintillator array 1. For example, a structure that has a side face light guides 3 and 4 optically coupled to only a part of the side face of the scintillator array 1 may be employed as illustrated in the plan view of FIG. 12. In this case, also, the structure does not necessarily need to be provided with the side face light guides 3 and 4 in all the side faces in combination with the above-described modified example (6), but the structure may be provided with only either of the side face light guide 3 or the side face light guide 4, and furthermore, may be provided with only one light guide 3 or 4. Also in FIG. 12, the area of the side face light guide is illustrated by a thick frame in order to distinguish the area of the side face light guide from the scintillator array 1.

Figure 13:
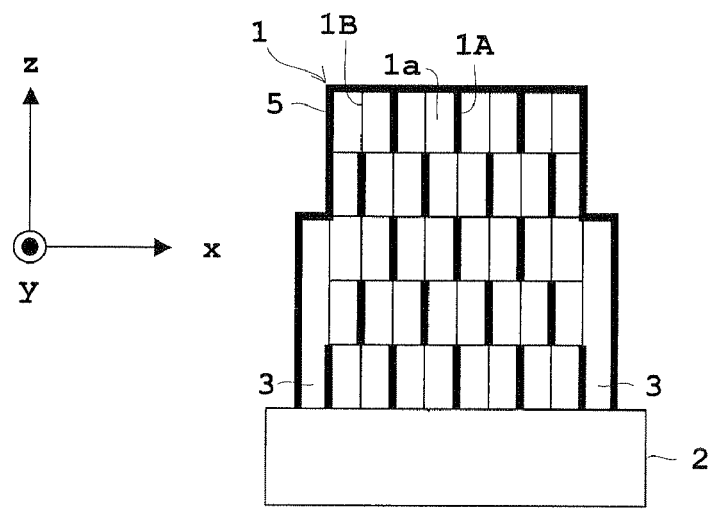
FIG. 13 is a schematic sectional view of a radiation detector concerning a further modification.

(8) In the above-described each embodiment, the side face light guides 3, 4 are disposed on a side face opposite to the side face to which the reflector 1A of the scintillator element 1a in the end area adjoins, but the present invention is not limited to this structure. For example, as illustrated in the sectional view of FIG. 13, the side face light guide 3 may be disposed on a side face opposite to the side face to which the transmissive material 1B of the scintillator element 1a in the end area adjoins. Similar disposition may be adopted for the side face light guide 4.

The present invention may be embodied in other specific forms without departing from the spirit or essential attributes thereof and, accordingly, reference should be made to the appended claims, rather than to the foregoing specification, as indicating the scope of the invention.

What is claimed is:

1. A radiation detector having a scintillator array consisting of a plurality of three dimensionally disposed scintillator elements, and a photoelectric conversion element, the photoelectric conversion element being optically coupled to the scintillator array, the radiation detector comprising a side face light guide that is optically coupled to at least a part of a side face of the scintillator array, wherein a face of the side face light guide that is opposite a face of the side face light guide that is adjacent to the scintillator array does not contact the photoelectric conversion element.

2. The radiation detector according to claim 1, wherein at least a part of the side face light guide element is formed of an optical member having light transmittance.

3. The radiation detector according to claim 2, wherein a reflector is interposed between the side faces of the mutually adjoining side face light guide elements in a side face direction.

4. The radiation detector according to claim 2, wherein a reflector is not interposed between the side faces of the mutually adioining side face light guide elements in a side face direction.

5. The radiation detector according to claim 2, wherein the optical member is made of epoxy resins, acrylic resins, or glass.

6. The radiation detector according to claim 2, wherein the side face light guide is disposed on a side face opposite to a side face to which the reflector of the scintillator element in the end area adjoins by partially interposing the reflector between a plurality of scintillator elements that constitute the scintillator array assembly.

7. The radiation detector according to claim 1, wherein at least a part of the side face light guide is formed by a scintillator.

8. The radiation detector according to claim 1, wherein an optically coupled bottom face light guide is provided between the scintillator array and the photoelectric conversion element.

9. The radiation detector according to claim 8, wherein the side face light guide and the bottom light guide are formed in a state of close contact with each other, and are optically integrally formed with each other without any boundary therebetween.

10. The radiation detector according to claim 8, wherein a boundary is provided by interposition of a transmissive material between the side face light guide and bottom face light guide.

11. The radiation detector according to claim 8, wherein a reflector is interposed on a side face of the mutually adjoining bottom face light guide in a side face direction.

12. The radiation detector according to claim 8, wherein a reflector is not interposed on a side face of the mutually adjoining bottom face light guide in a side face direction.

13. The radiation detector according to claim 1, wherein scintillator elements arranged along a same horizontal plane constitute a stage, and the scintillator array comprises at least two stages, and wherein a reflector and a transmissive material interpose alternately between the scintillator elements adjoining with each other in each stage of the plurality of scintillator elements constituting the scintillator array.

14. The radiation detector according to claim 13, wherein the reflector and the transmissive material of each stage are disposed alternately.

15. The radiation detector according to claim 1, wherein the height of the side face light guide is formed lower than the height of entire stages of the scintillator element constituting the scintillator array.

16. The radiation detector according to claim 1, wherein the side face light guide is integrally formed in a depth direction without interposition of a transmissive material.

17. The radiation detector according to claim 1, wherein the photoelectric conversion element is a photo detector having a plurality of photo detecting sensors disposed in a shape of a two-dimensional plane.

18. The radiation detector according to claim 17, wherein the photo detector is a multi-anode photo multiplier tube, a multi channel avalanche photodiode, or a silicon photo-multiplier.

19. A radiation detector having a scintillator array consisting of a plurality of three dimensionally disposed scintillator elements, and a photoelectric conversion element, the photoelectric conversion element being optically coupled to the scintillator array, the radiation detector comprising a side face light guide that is optically coupled to at least a part of a side face of the scintillator array,
  wherein an optically coupled bottom face light guide is provided between the scintillator array and the photoelectric conversion element, and
  wherein the side face light guide and the bottom light guide are formed in a state of close contact with each other, and are optically integrally formed.with each other without any boundary therebetween.

20. A radiation detector having a scintillator array consisting of a plurality of three dimensionally disposed scintillator elements, and a photoelectric conversion element, the photoelectric conversion element being optically coupled to the scintillator array, the radiation detector comprising a side face light guide that is optically coupled to at least a part of a side face of the scintillator array,
  wherein an optically coupled bottom face light guide is provided between the scintillator array and the photoelectric conversion element, and
  wherein a boundary is provided by interposition of a transmissive material between the side face light guide and bottom face light guide.

* * * * *